United States Patent
Floyd, III et al.

(10) Patent No.: US 10,305,789 B2
(45) Date of Patent: *May 28, 2019

(54) PACKET FORWARDING FOR QUALITY OF SERVICE DELIVERY

(71) Applicant: INTERNATIONAL BUSINESS MACHINES CORPORATION, Armonk, NY (US)

(72) Inventors: Robert K. Floyd, III, Clermont, FL (US); Richard E. Harper, Chapel Hill, NC (US); Ruchi Mahindru, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,473

(22) Filed: Mar. 6, 2017

(65) Prior Publication Data
US 2018/0254983 A1 Sep. 6, 2018

(51) Int. Cl.
*H04L 12/851* (2013.01)
*H04L 12/701* (2013.01)
(Continued)

(52) U.S. Cl.
CPC ........ *H04L 45/302* (2013.01); *H04L 43/0817* (2013.01); *H04L 43/0858* (2013.01);
(Continued)

(58) Field of Classification Search
CPC ........... G06F 15/17312; H04L 41/0896; H04L 47/6215
(Continued)

(56) References Cited

U.S. PATENT DOCUMENTS 7,313,627 B1 * 12/2007 Noble .................. H04L 47/10
709/232
7,580,355 B2 8/2009 Zhao et al.
(Continued)

OTHER PUBLICATIONS

Chen et al, "Joint Probabilistic Scheduling and Adaptive Modulation for Queue and Channel Aware Links", Journal, IEEE ICC 2016, Wireless Communications Symposium, 6 pgs., Jun. 2016.
(Continued)

*Primary Examiner* — Asad M Nawaz
*Assistant Examiner* — Jason A Harley
(74) *Attorney, Agent, or Firm* — Cantor Colburn LLP; Grant Johnson

(57) ABSTRACT

Embodiments of the present invention include methods, systems, and computer program products for packet forwarding. Aspects of the invention include receiving, from a source node, a first network queue in a set of network queues, wherein the first network queue includes one or more minimum network traffic performance requirements. A set of network paths is analyzed to determine a performance level for each network path and identify a first network path and a second network path with a performance level above the one or more minimum performance requirements of the first network queue. A determination is made that the first network path has a higher performance level than the second network path. Based at least in part on determining that the first network path has a higher performance level than the second network path, the first network queue is mapped to the first network path.

11 Claims, 7 Drawing Sheets

(51) Int. Cl.
  *H04J 1/16* (2006.01)
  *H04L 12/725* (2013.01)
  *H04L 12/865* (2013.01)
  *H04L 12/863* (2013.01)
  *H04L 12/707* (2013.01)
  *H04L 12/26* (2006.01)

(52) U.S. Cl.
  CPC .......... *H04L 43/0882* (2013.01); *H04L 45/22* (2013.01); *H04L 47/6215* (2013.01); *H04L 47/6225* (2013.01); *H04L 47/6275* (2013.01)

(58) Field of Classification Search
  USPC .................................................. 370/412, 429
  See application file for complete search history.

(56) References Cited

U.S. PATENT DOCUMENTS

| | | | |
|---|---|---|---|
| 7,653,069 | B2 | 1/2010 | Lakshmanamurthy et al. |
| 8,305,915 | B2 | 11/2012 | Garcia et al. |
| 8,565,092 | B2 | 10/2013 | Arumilli et al. |
| 8,848,529 | B2 | 9/2014 | Voruganti et al. |
| 8,879,561 | B2 | 11/2014 | Chamas et al. |
| 8,923,270 | B2 | 12/2014 | Lee et al. |
| 9,288,154 | B2 | 3/2016 | Yang et al. |
| 2009/0232001 | A1* | 9/2009 | Gong ...................... H04L 47/10 370/236 |
| 2013/0094397 | A1 | 4/2013 | Kim et al. |
| 2014/0341027 | A1 | 11/2014 | Chen et al. |
| 2014/0376564 | A1* | 12/2014 | Li ........................ H04L 47/6225 370/412 |
| 2015/0124835 | A1 | 5/2015 | McCanne et al. |
| 2015/0131446 | A1 | 5/2015 | Kwan et al. |
| 2015/0156082 | A1* | 6/2015 | Kakadia .............. H04L 41/5009 709/223 |

OTHER PUBLICATIONS

Cisco Sytems, Inc., "Cisco ASR 1000 Series Aggregation Services Routers: QoS Architecture and Solutions," http://www.cisco.com/c/en/us/products/collateral/routers/asr-1002-router/solution_overview_c22-449961.html, 2008, pp. 1-12.

Jin et al, "A Novel Packet Queuing and Scheduling Algorithm and Its Link Sharing Performance for the Home Internet Gateway", Journal (ICISE 2009), pp. 1565-1568, Jul. 2009.

Sudhiharto et al.; "Comparative Analysis of Voice Over Internet Protocol (VoIP) Quality on Priority Queue (PQ) and Class-Based Queue (CBQ) Management System Using Link-Sharing Mechanism Setting", Journal 3rd (ICoICT), pp. 419-424. Sep. 2015.

List of IBM Patents or Patent Applications treated as related; (Appendix P), Filed Nov. 13, 2017; 2 pages.

R. Floyd III, et al., "Packet Forwarding for Quality of Service Delivery", U.S. Appl. No. 15/810,238, filed Nov. 13, 2017.

* cited by examiner

PACKET FORWARDING FOR QUALITY OF SERVICE DELIVERY

BACKGROUND

The present invention relates generally to packet forwarding, and more specifically, to packet forwarding for quality of service delivery.

A computer network or data network is typically made up of nodes connected together by data links. These nodes are usually computer systems, such as personal computers, servers, and networking hardware (e.g., switches). Each of these computer systems sends and receives network packets to and from other computer systems within the computer network over a number of possible data links or network paths. A network packet is a formatted unit of data carried by the computer network. While the multiple data links and network paths are installed within a computer network for redundancy, these paths and links are not always of the same quality and speed.

Network traffic is the amount of data (packets) moving across the computer network at a given time. Network traffic can be sorted into different classes (types) with each network traffic class having different performance requirements and/or constraints. For example, storage area network (SAN) Volume Controller (SVC) global mirroring, which is a form of storage appliance-based data replication, requires a high amount of bandwidth in a high quality network with minimal dropouts and packet re-ordering to achieve a low recovery point objective (RPO). However, a host-based replication in which the replication emanates from the software of a server can tolerate a lower quality network. Initial replication typically requires large bandwidth but cannot tolerate a low latency, and a near-sync replication requires a large bandwidth and can tolerate a low latency.

SUMMARY

Embodiments of the present invention include a computer implemented method for packet forwarding. The method includes receiving, from a source node, a first network queue in a set of network queues, wherein the first network queue includes one or more minimum network traffic performance requirements. A set of network paths is analyzed to determine a performance level for each network path in the set of network paths and identify a first network path and a second network path in the set of network paths with a performance level above the one or more minimum performance requirements of the first network queue. A determination is made that the first network path has a higher performance level than the second network path. Based at least in part on the determination that the first network path has a higher performance level than the second network path, the first network queue is mapped to the first network path.

Embodiments of the present invention include a computer system for packet forwarding. The computer system includes a server having a processor that is configured to perform a method. The method includes receiving, from a source node, a first network queue in a set of network queues, wherein the first network queue includes one or more minimum network traffic performance requirements. A set of network paths is analyzed to determine a performance level for each network path in the set of network paths and identify a first network path and a second network path in the set of network paths with a performance level above the one or more minimum performance requirements of the first network queue. A determination is made that the first network path has a higher performance level than the second network path. Based at least in part on determining the first network path has a higher performance level than the second network path, the first network queue is mapped to the first network path.

Embodiments of the present invention include a computer program product for packet forwarding, wherein the computer program product includes a non-transitory computer readable storage medium having computer readable program code embodied therewith. The computer readable program code includes computer readable program code configured to perform a method. The method includes receiving, from a source node, a first network queue in a set of network queues, wherein the first network queue includes one or more minimum network traffic performance requirements. A set of network paths is analyzed to determine a performance level for each network path in the set of network paths and identify a first network path and a second network path in the set of network paths with a performance level above the one or more minimum performance requirements of the first network queue. A determination is made that the first network path has a higher performance level than the second network path. Based at least in part on determining the first network path has a higher performance level than the second network path, the first network queue is mapped to the first network path.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DESCRIPTION OF THE DRAWINGS

The subject matter which is regarded as embodiments of the present invention is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
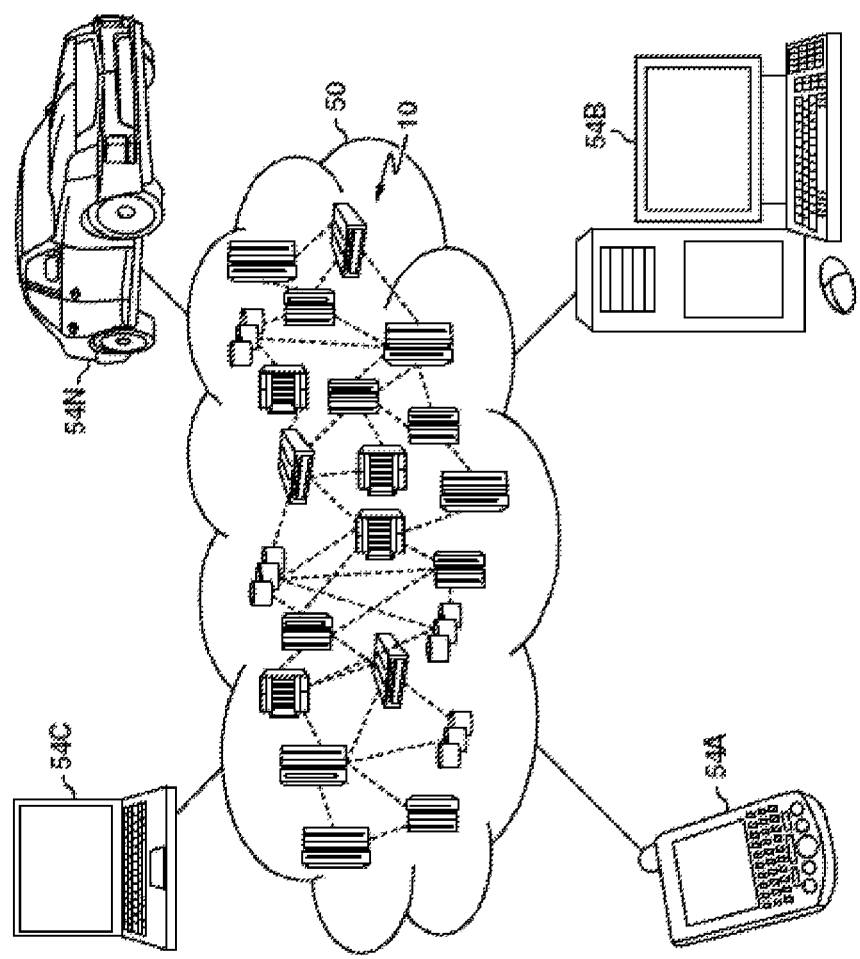
FIG. 1 depicts a cloud computing environment according to one or more embodiments of the present invention.

In accordance with exemplary embodiments of the present invention, methods, systems and computer program products for packet forwarding are provided. Aspects of the invention include assigning different classes of network traffic to different network queues based at least in part on each network traffic class's performance requirements. Some examples of performance requirements include latency, bandwidth, and network quality. Aspects of the invention include identifying multiple network paths that have different costs, performance characteristics, and path capabilities. In an exemplary approach, the network paths are differentiated by, for example, the number of switches in the path or the fact that the path follows a different route but can have the same or similar costs, performance characteristics, and path capabilities as other network paths. The present invention optimizes the assignment of the network traffic queues to a network path based on performance requirements of the network traffic. Moreover, the network paths are monitored to identify certain events that would trigger a re-optimization of the network traffic queue assignment to new or different network paths. The events that would trigger a re-optimization include, but are not limited to, a user-defined periodic time for re-optimization, any changes above a certain threshold for traffic and utilization of the network path, a threshold number of dropped packets in the network path that can be due to excessive utilization, any service level agreement (SLA) latency violations, any detection of a new device that may come online such as a switch or modem, any new flows that may come online, any user input that requires re-optimization, any transfer control protocol (TCP) re-transmissions that are observed in the network path, or any other network changes. The mapping of the network traffic to the network paths does not remain static and is responsive to events which trigger a re-mapping of the network traffic.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
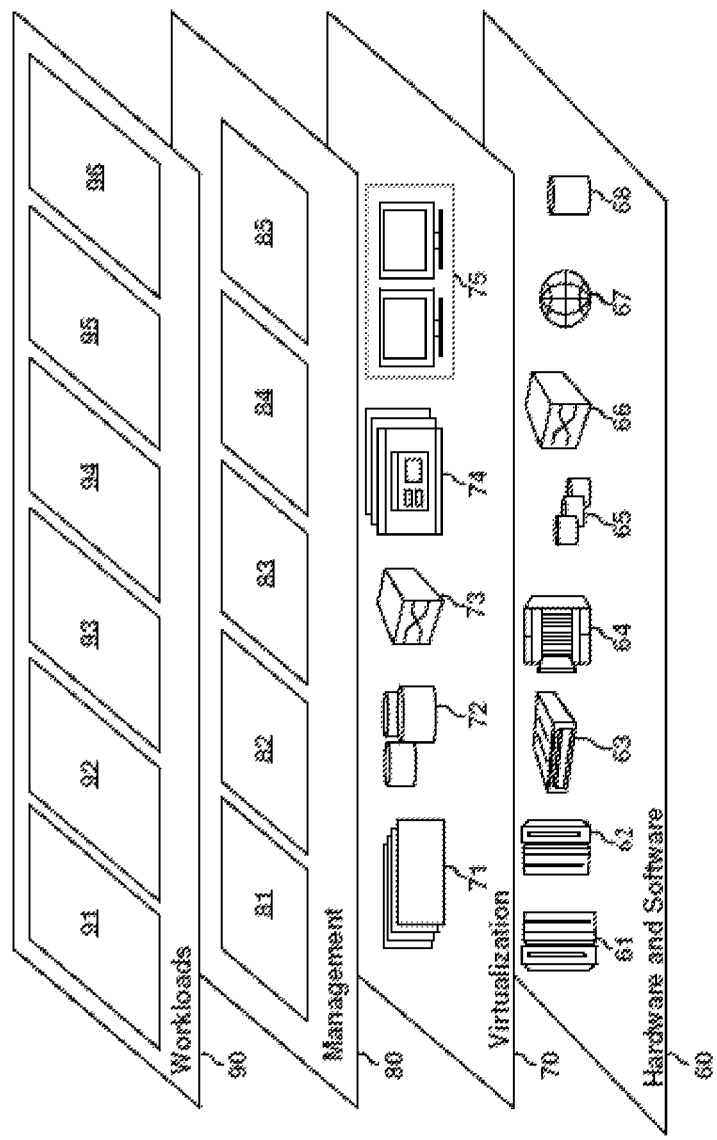
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and packet forwarding for quality of service delivery 96.

Figure 3:
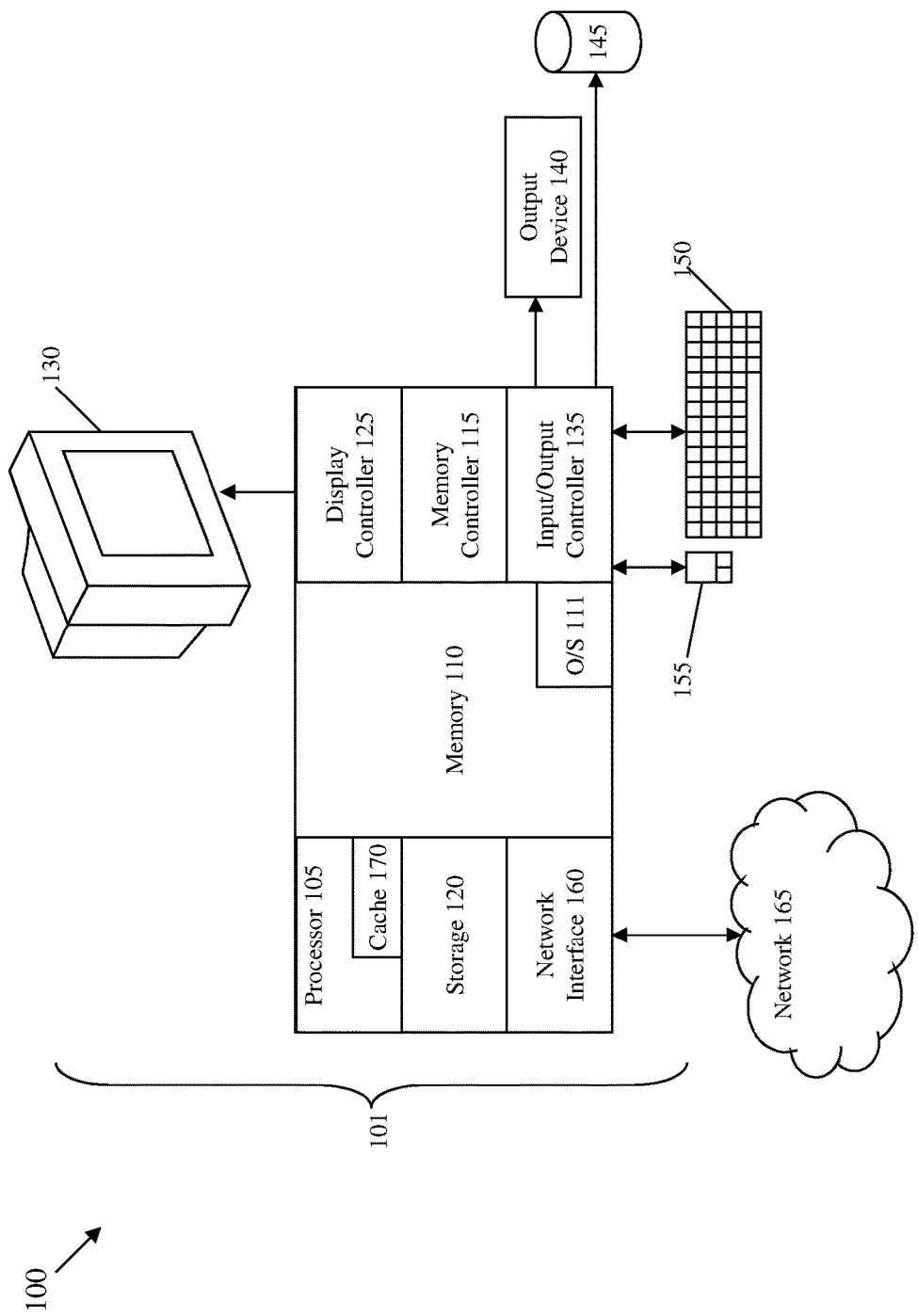
FIG. 3 illustrates a block diagram of a computer system for use in practicing the teachings herein.

FIG. 3 illustrates a block diagram of an exemplary computer system 100 for use with the teachings herein. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 3, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 can have additional elements, which are omitted for simplicity, such as controllers, buffers (caches), drivers, repeaters, and receivers, to enable communications. Further, the local interface can include address, control, and/or data connections to enable appropriate communications among the aforementioned components. The storage device 120 can include one or more hard disk drives (HDD), solid state drives (SSD), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 can include a cache 170, which can be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read-only memory (PROM), tape, compact disc read only memory (CD-ROM), disk, diskette, cartridge, cassette or the like, etc.). Moreover, the memory 110 can incorporate electronic, magnetic, optical, and/or other types of storage media. Note that the memory 110 can have a distributed architecture, where various components are situated remote from one another, but can be accessed by the processor 105.

The instructions in memory 110 can include one or more separate programs, each of which comprises an ordered listing of executable instructions for implementing logical functions. In the example of FIG. 3, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 can include input devices, for example but not limited to a printer, a scanner, microphone, and the like. Finally, the I/O devices 140, 145 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 can be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 can be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 can further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

Figure 4:
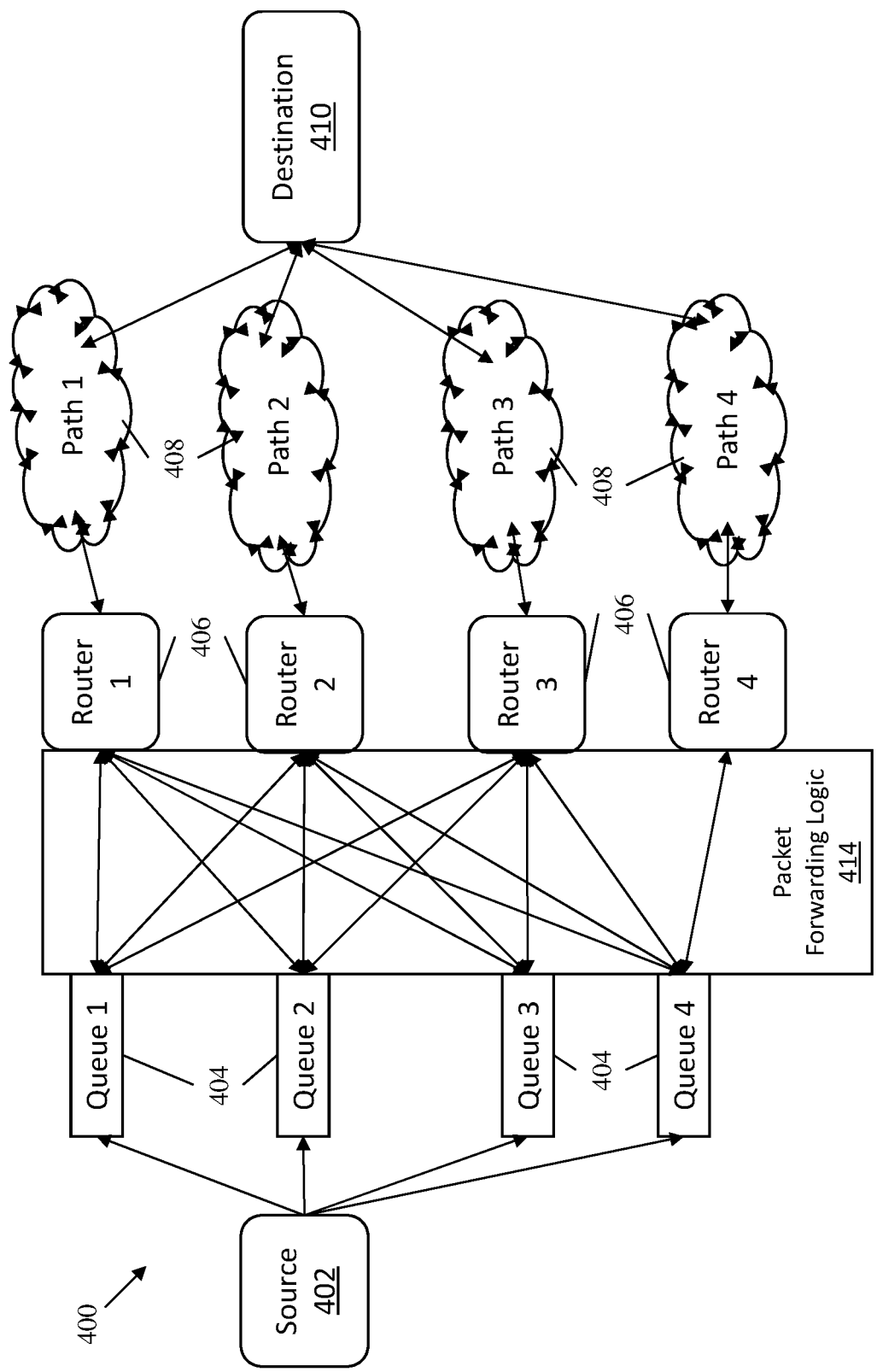
FIG. 4 illustrates a block diagram of a system for packet forwarding according to one or more embodiments of the present invention.

FIG. 4 is a block diagram of a system 400 for packet forwarding according to one or more embodiments of the invention. The system 400 includes a source node 402, a set of network queues 404, packet forwarding logic 414, a set of routers 406, a set of network paths 408, and a destination node 410, configured and arranged as shown. For ease of illustration, four network queues 404, routers 405 and network paths 408 are shown. However, any number of network queues 404, routers 405 and network paths 408 can be utilized. The number of queues 404 may or may not equal the number of routers 406. Although one source 402 and one destination 410 node are shown in FIG. 4, multiple source nodes and destination nodes can be implemented.

The queues 404 contain network traffic that is associated with a network traffic class. For example, a network traffic class can have certain requirements such as the requirement for high bandwidth and the need for a high quality network (i.e. minimal dropouts and packet reordering). Another network queue 404 can tolerate a low quality network with minimal bandwidth. The system 400 utilizes the packet forwarding logic 414 to assign the packets in each of the queues 404 to a router 406 and a network path 408 that meets the requirements of the network traffic class associated with the packets.

Each network path 408 has intrinsic characteristics (e.g., transmission speed, bandwidth capabilities, number of physical lines, number of hops, and latency) that are associated with the network path 408 that can vary over time. These intrinsic characteristics of each network path 408 determine a performance level for each network path 408. In general, these intrinsic characteristics need not be the same for each network path, and the system 400, in accordance with aspects of the invention, dynamically utilizes these disparate paths to meet the aggregate requirements of the network queues in an optimal manner.

In embodiments of the invention, the system 400 maps network traffic in the network queues 404 to network paths 408 to achieve minimum performance levels for the different classes of network traffic. The system 400 continuously monitors the performance levels of each of the network paths 408 to ensure the minimum network traffic performance requirement is met by the currently assigned network path 408. For example, a first queue can have network traffic that requires high bandwidth and a high quality network connection (i.e. minimal dropouts and packet re-ordering). This first queue can be mapped to one or more network paths 408 having the minimum performance level to meet the minimum network traffic performance requirements. After the first queue is mapped to one or more network paths 408, the system 400 continuously monitors all the network paths 408. Any changes in the performance level of a network path can cause network queue (and network traffic) re-mapping.

In one or more embodiments of the invention, the system 400 utilizing the packet forwarding logic 414 will optimize the mapping of each network queue 404 to the one or more network paths 408 based at least in part on the one or more minimum network traffic performance requirements for each network queue. The system 400 through the packet forwarding logic 414 will continuously monitor the network paths 408 and will utilize triggers that will cause a re-optimization of the network queues mapping to the network paths. The re-optimization triggers can include changes to the traffic classes and utilization, a threshold level of dropped packets or discards due to excessive utilization, latency SLA violations, new devices coming online (NMS), new flows coming online (Netflow or other system inputs), input from a network administrator, any TCP re-transmissions observed, new paths detected, and/or existing paths being resized. In addition to these triggers, re-optimization can occur periodically.

In one or more embodiments of the invention, the re-optimization causes the network queue mapping to network paths to change in response to performance triggers as mentioned above. As these network paths change, any network paths that do not meet a minimum network traffic performance requirement can be deleted or decommissioned in order to minimize costs.

Figure 5:
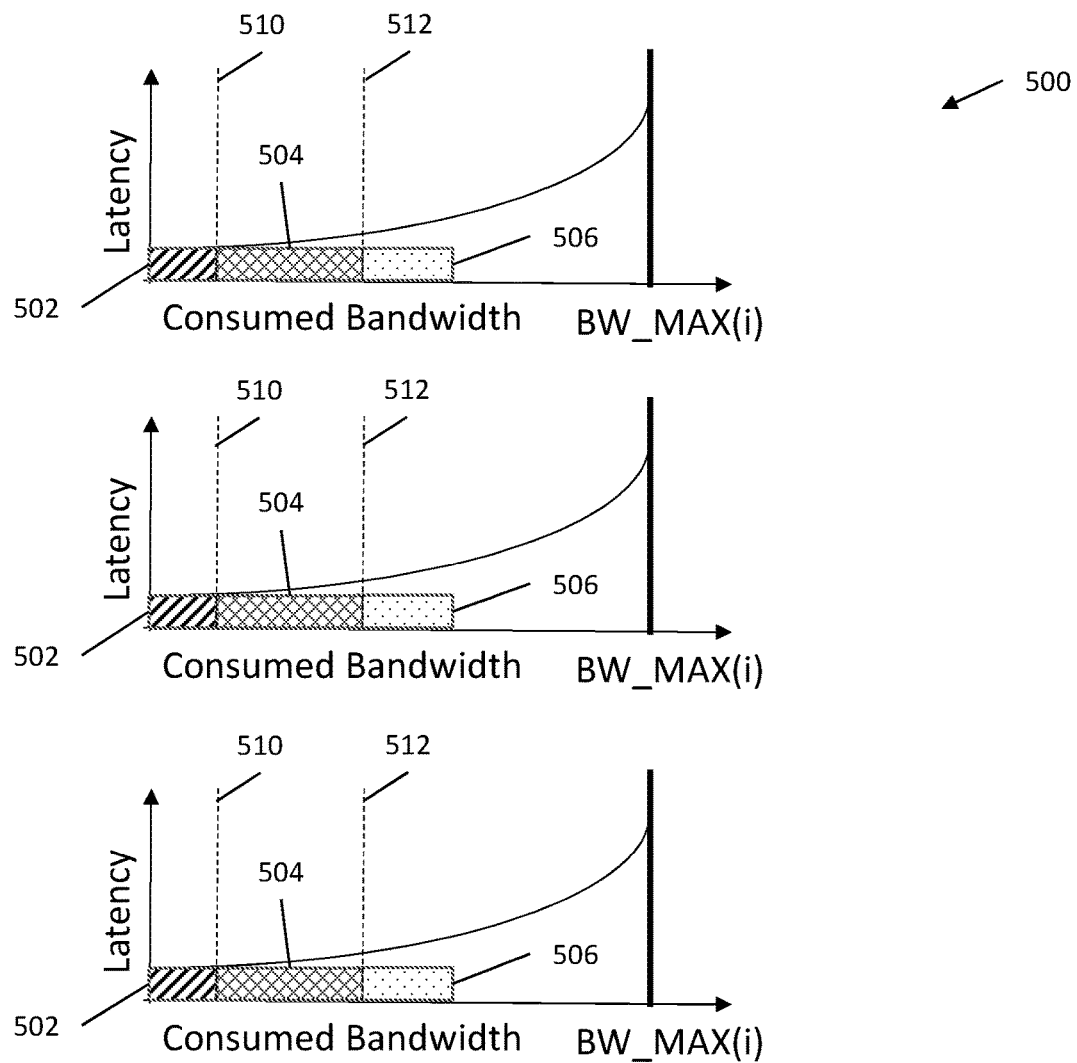
FIG. 5 illustrates a set of graphs showing latency versus bandwidth utilization curves according to one or more embodiments of the present invention.

FIG. 5 is a set of graphs showing latency versus bandwidth utilization curves according to one or more embodiments of the invention. Latency versus bandwidth is a performance characteristic of a network path that is important in determining whether that network path can meet the performance requirements of a network class. In the illustrated example, in the set of graphs 500, each graph represents a network path and shares the same or similar bandwidth to latency curve. For each graph, the network latency increases as bandwidth increases. This is a general characteristic of all network paths. The set of graphs 500 show three network queues. The first network queue 502 has the highest network traffic performance requirements. The second network queue 504 has the second highest network traffic performance requirements and the third network queue 506 has the third highest network traffic performance requirements. As shown in the set of graphs 500, the first network queue 502 has a network traffic that requires latency below a first threshold 510. As the latency increases for each network link, the first network queue 502 is mapped to the two other network links to maintain the required minimum network traffic performance. As the second network queue 504 has less stringent requirements for latency, the second network queue 504 is assigned to the network links up until a second threshold 512 is met. The third network queue 506 does not have a low latency requirement and as such can be assigned or mapped to the three network paths in a round-robin like manner. In one or more embodiments of the present invention, network paths 408 that have the same or similar network performance levels can have network traffic mapped to these paths in a round-robin manner so that portions of the network traffic are sent to more than one network path that have the same or similar performance levels.

Figure 6:
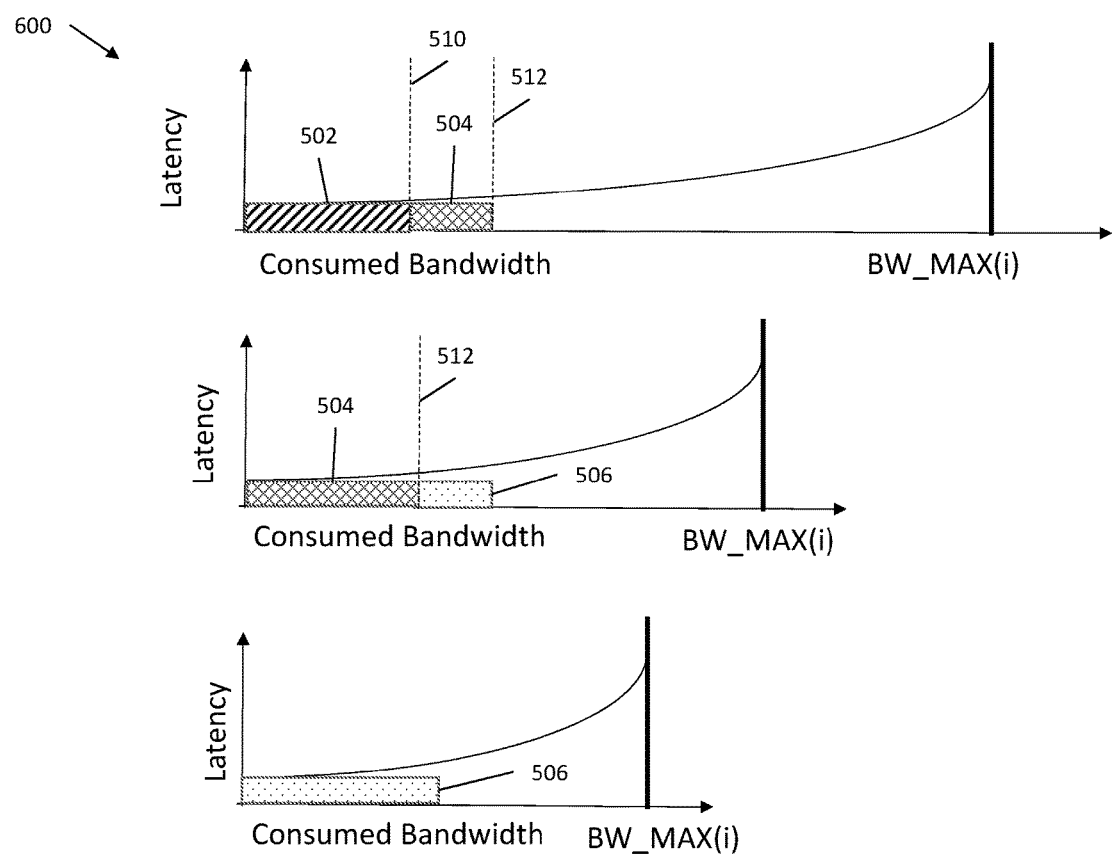
FIG. 6 illustrates an additional set of graphs showing latency versus bandwidth utilization curves according to one or more embodiments of the present invention.

FIG. 6 is a set of graphs showing latency versus bandwidth utilization curves according to one or more embodiments of the invention. In the illustrated example, each graph in the set of graphs 600 represents a network path and has different bandwidth to latency curves. For each of these graphs, network latency increases as consumed bandwidth increases. The first network queue 502 with the highest network traffic performance requirements is mapped to the first network path represented by the top graph. The top graph has enough bandwidth at a low enough latency to accommodate the network traffic performance requirements of the first network queue 502. While in the illustrated example, the first threshold 510 for the latency is at the end of the representation of the first network queue 502, in one or more embodiments of the invention, this first threshold 510 could extend into the second network queue 504. The second network queue 504 also utilizes bandwidth in the first network path up until a second threshold 512 latency is reached. After this second threshold 512 is met, the second network queue 504 is mapped to a second network path as represented by the middle graph in the set of graphs 600. This second network does not have a latency that is below the first threshold 510; however, the latency is below the second threshold 512 latency as required for the second network queue 504. The third network queue 506 is mapped to a portion of the second network path and a portion of the third network path as illustrated in the bottom graph in the set of graphs 600. Although the latency requirements for the third network queue 506 is not violated by any of the remaining three network paths, the system 400 will minimize the latency for the third network queue 506 and map the portion of the third network queue to the third network path. As a network path no longer meets the performance requirements of the network queue, the system 400 iteratively maps remaining traffic associated with the network queue to additional network paths such that no network path is over utilized and the traffic requirements of the entire network queue is met.

In one or more embodiments of the invention, the optimization and re-optimization of network paths can occur utilizing an algorithm defined in the packet forwarding logic 414 of the system 400. The inputs include a set of Links, denoted I, $0<I<\max(I)$; a set of Queues, denoted Qj, $0<j<\max(j)$. The parameters of the algorithm include a Queue Fraction QF(I) which represents a fraction of a queue's traffic assigned to a link I. The sum of QF(I) is equal to one (1) meaning that all of a queue's bandwidth is absorbed by the set of links between $0<I<n$. Bandwidth BW as a function of a link I is BW(I). BW(I) is equal to the bandwidth of a network path BW multiplied times the queue fraction QF(I). The Latency (BW(I)) is the latency of link I when BW(I) is assigned to the link I. The optimization problem is to vary QF(I), with $0<I<n$ to minimize the maximum Latency (BW(I)), $0<I<\max(I)$ such that the following constraints are met: QF(I)>=0; sum QF(I)=1; BW(I)=BW(0,I)+BW*QF(I); and BW(I)<BW_MAX(I). This formulation allows the optimization to be solved as a min/max linear programming problem. A graphical illustration of this optimization is depicted in FIGS. 5 and 6 and described in detail above.

Figure 7:
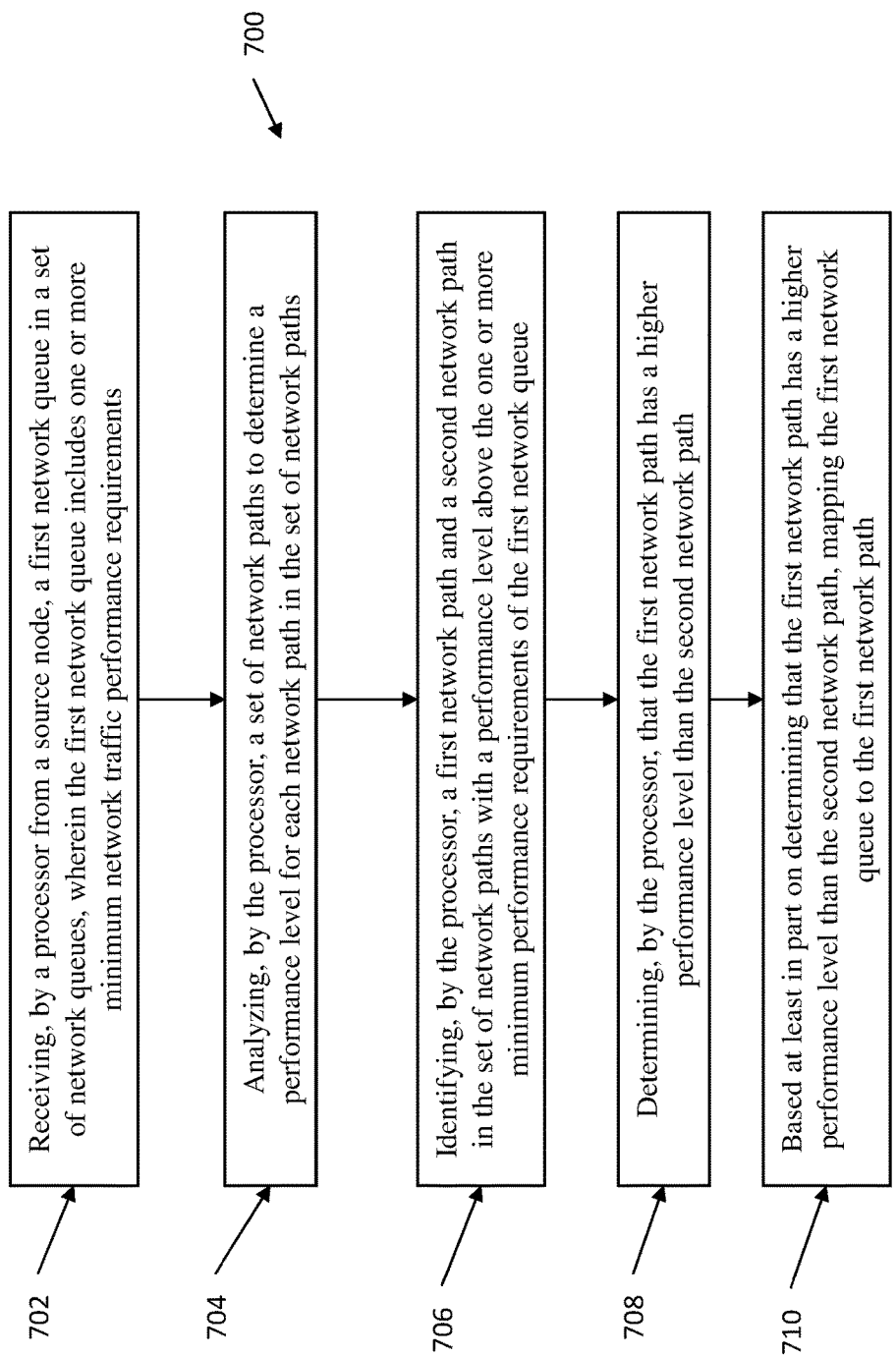
FIG. 7 illustrates a flow diagram of a method for packet forwarding according to one or more embodiments of the present invention.

FIG. 7 illustrates a flow diagram of a method 700 for packet forwarding according to one or more embodiments of the invention. The method 700 includes receiving, by a processor from a source node, a first network queue in a set of network queues, wherein the first network queue includes one or more minimum network traffic performance requirements, as shown at block 702. At block 704, the method 700 includes analyzing, by the processor, a set of network paths to determine a performance level for each network path in the set of network paths. The method 700, at block 706, includes identifying, by the processor, a first network path and a second network path in the set of network paths with a performance level above the one or more minimum performance requirements of the first network queue. The method 700 includes determining, by the processor, that the first network path has a higher performance level than the second network path, as shown at block 708. At block 710, based at least in part on determining the first network path has a higher performance level than the second network path, the method 700 maps the first network queue to the first network path.

Examples of how a packet propagates through the system 400 shown in FIG. 4 in accordance with aspects of the invention will now be provided. A packet for transmission is generated by source 402 and the system 400 assigns the packet to a network traffic queue 404 based at least in part on the performance requirements of the packet. The network traffic queues 404 are mapped by the system 400 utilizing the packet forwarding logic 414 to routers 406 associated with network paths 408. The packet forwarding logic 414 determines the packet performance needs and maps the network queue 404 associated with the packet to a network path 408 that meets at least the minimum requirements for the packet performance. The packet is forwarded to the destination 410 node through the network path 408 mapped by the system 400. The system 400 monitors the network paths 408 to determine whether any changes have occurred that would trigger a re-mapping of the network queues 404 to the network paths 408.

Additional processes can also be included. The optimization process can be readily extended to optimize the mapping of the network queues to multiple network paths according to any other commonly occurring attributes of a network queue and a network path. It should be understood that the processes depicted in FIG. 7 represent illustrations, and that other processes can be added or existing processes can be removed, modified, or rearranged without departing from the scope and spirit of the present disclosure.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for packet forwarding, the computer system comprising:
 a server having a processor, the processor configured to:
  receive, from a source node, a first network queue in a set of network queues, wherein the first network queue includes one or more minimum network traffic performance requirements;
  analyze a set of network paths to determine a performance level for each network path in the set of network paths;
  identify a first network path and a second network path in the set of network paths with a performance level above the one or more minimum performance requirements of the first network queue;
  determine that the first network path has a higher performance level than the second network path; and
  based at least in part on determining that the first network path has a higher performance level than the second network path, map the first network queue to the first network path
  monitor the set of network paths to identify a trigger associated with the first network path in the set of network paths, wherein the trigger comprises an indication of a change to a performance level of the first network path, wherein the indication comprises at least one of a user-defined periodic time for re-optimization, changes above a threshold for traffic and utilization of the first network path, a threshold number of dropped packets in the first network path, detection of a new device coming online, new flows coming online, a user input requiring re-optimization, or a transfer control protocol (TCP) re-transmissions observed in the first network path.

2. The system of claim 1, wherein the processor is further configured to:
re-map the first network queue to one or more alternate network paths based at least in part on the trigger associated with the first network path.

3. The system of claim 1, wherein the monitoring of the set of network paths is performed periodically.

4. The system of claim 1, wherein the processor is further configured to:
determine that the first network path has a performance level substantially equal to the second network path; and
based at least in part on determining that the first network path has a performance level substantially equal to the second network path:
mapping a first portion of the first network queue to the first network path; and
mapping a second portion of the first network queue to the second network path.

5. The system of claim 4, wherein the mapping the first portion of the first network queue and the second portion of the first network queue is performed in a round-robin manner.

6. The system of claim 1, wherein the one or more minimum network traffic performance requirements includes at least one of network path bandwidth, network path latency, network path availability, and network path number of hops.

7. A computer program product for packet forwarding, the computer program product comprising a non-transitory computer readable storage medium having program instructions embodied therewith, the program instructions executable by a processor to cause the processor to perform:
receiving, from a source node by the processor, a first network queue in a set of network queues, wherein the first network queue includes one or more minimum network traffic performance requirements;
analyzing, by the processor, a set of network paths to determine a performance level for each network path in the set of network paths;
identifying, by the processor, a first network path and a second network path in the set of network paths with a performance level above the one or more minimum performance requirements of the first network queue;
determining, by the processor, that the first network path has a higher performance level than the second network path; and
based at least in part on determining that the first network path has a higher performance level than the second network path, mapping the first network queue to the first network path;
monitoring, by the processor, the set of network paths to identify a trigger associated with the first network path in the set of network paths, wherein the trigger comprises an indication of a change to a performance level of the first network path, wherein the indication comprises at least one of a user-defined periodic time for re-optimization, changes above a threshold for traffic and utilization of the first network path, a threshold number of dropped packets in the first network path, detection of a new device coming online, new flows coming online, a user input requiring re-optimization, or a transfer control protocol (TCP) re-transmissions observed in the first network path.

8. The computer program product of claim 7 further comprising:
re-mapping the first network queue to one or more alternate network paths based at least in part on the trigger associated with the first network path.

9. The computer program product of claim 7, wherein the monitoring of the set of network paths is performed periodically.

10. The computer program product of claim 7 further comprising:
determining that the first network path has a performance level substantially equal to the second network path;
based at least in part on determining that the first network path has a performance level substantially equal to the second network path:
mapping a first portion of the first network queue to the first network path; and
mapping a second portion of the first network queue to the second network path.

11. The computer program product of claim 10, wherein the mapping the first portion of the first network queue and the second portion of the first network queue is performed in a round-robin manner.

* * * * *